US009166867B2

(12) United States Patent
Gage

(10) Patent No.: US 9,166,867 B2
(45) Date of Patent: Oct. 20, 2015

(54) SEAMLESS ROAMING

(75) Inventor: Kenneth L. Gage, Glendale, AZ (US)

(73) Assignee: Qualcomm Incorporated, San Diego, CA (US)

(*) Notice: Subject to any disclaimer, the term of this patent is extended or adjusted under 35 U.S.C. 154(b) by 1665 days.

(21) Appl. No.: 10/763,289

(22) Filed: Jan. 23, 2004

(65) Prior Publication Data

US 2004/0151136 A1 Aug. 5, 2004

Related U.S. Application Data

(60) Provisional application No. 60/442,973, filed on Jan. 27, 2003.

(51) Int. Cl.
*H04L 29/12* (2006.01)
*H04L 29/06* (2006.01)
(Continued)

(52) U.S. Cl.
CPC ...... *H04L 29/1233* (2013.01); *H04L 29/12018* (2013.01); *H04L 61/10* (2013.01); *H04L 61/2592* (2013.01); *H04L 69/14* (2013.01); *H04L 69/18* (2013.01); *H04W 8/26* (2013.01); *H04L 29/12462* (2013.01); *H04L 61/255* (2013.01); *H04W 8/087* (2013.01); *H04W 36/14* (2013.01); *H04W 80/04* (2013.01); *H04W 88/06* (2013.01)

(58) Field of Classification Search
CPC .................. H04L 29/12018; H04L 29/1233; H04L 61/10; H04L 61/2592; H04L 69/14; H04L 69/18; H04L 29/12462; H04L 61/255; H04W 8/26; H04W 36/14; H04W 80/04; H04W 88/06; H04W 8/087
USPC .................................................. 370/331–333
See application file for complete search history.

(56) References Cited

U.S. PATENT DOCUMENTS 5,303,289 A * 4/1994 Quinn ........................... 455/438
6,115,608 A 9/2000 Duran et al.
(Continued)

FOREIGN PATENT DOCUMENTS

JP 10327463 12/1998
JP 2000287245 A 10/2000
(Continued)

OTHER PUBLICATIONS

IEEE Std. 1180-1990; "IEEE Standard Specifications for the Implementations of 8x8 Inverse Discrete Cosine Transform," IEEE CAS Standards Committee of the IEEE Circuits and Systems Society, pp. 1-13, Approved Dec. 6, 1990.
(Continued)

*Primary Examiner* — Nam Huynh
(74) *Attorney, Agent, or Firm* — Howard Seo

(57) ABSTRACT

A method for providing network communication to a wireless device through a plurality of wireless protocol links. A first protocol link from the plurality of wireless protocol links is selected based on some predetermined criteria. A first network connection is established through the first protocol link. A second protocol link from the plurality of wireless protocol links is selected based on the change in status or condition of the first protocol link with respect to the predetermined criteria. A second network connection is established through the second protocol link, and the first network connection through the first protocol link is terminated.

35 Claims, 13 Drawing Sheets

(51) Int. Cl.
*H04W 8/26* (2009.01)
*H04W 8/08* (2009.01)
*H04W 36/14* (2009.01)
*H04W 80/04* (2009.01)
*H04W 88/06* (2009.01)

(56) References Cited

U.S. PATENT DOCUMENTS

| | | | | |
|---|---|---|---|---|
| 6,804,532 | B1* | 10/2004 | Moon et al. | 455/552.1 |
| 6,879,600 | B1* | 4/2005 | Jones et al. | 370/466 |
| 7,009,952 | B1* | 3/2006 | Razavilar et al. | 370/331 |
| 2001/0031634 | A1* | 10/2001 | Mizutani et al. | 455/425 |
| 2002/0078187 | A1* | 6/2002 | Rawson, III | 709/222 |
| 2002/0085516 | A1 | 7/2002 | Bridgelall | 370/329 |
| 2004/0028009 | A1* | 2/2004 | Dorenbosch et al. | 370/329 |
| 2004/0146021 | A1* | 7/2004 | Fors et al. | 370/331 |
| 2005/0080884 | A1* | 4/2005 | Siorpaes et al. | 709/223 |
| 2005/0176473 | A1* | 8/2005 | Melpignano | 455/574 |

FOREIGN PATENT DOCUMENTS

| | | |
|---|---|---|
| JP | 2002514855 T | 5/2002 |
| JP | 2002271436 | 9/2002 |
| WO | WO9957882 A1 | 11/1999 |
| WO | 0221768 A2 | 3/2002 |
| WO | WO02054820 A2 | 7/2002 |
| WO | WO02062094 A2 | 8/2002 |
| WO | WO02087268 A1 | 10/2002 |
| WO | 02096132 | 11/2002 ............... H04Q 7/00 |

OTHER PUBLICATIONS

International Search Report and Written Opinion, PCT/US04/002312, International Search Authority, European Patent Office, Aug. 24, 2004.

Campbell A T et al., "Design, Implementation, and Evaluation of Cellular IP ", IEEE Personal Communications, IEEE Communications Society, US, vol. 7, No. 4, Aug. 1, 2000, pp. 42-49, XP000954659, ISSN : 1070-9916, DO1 : 10.1109/98.863995 p. 44, right-hand column, line 59-p. 46, left-hand column, line 3.

European Search Report—EP11001089—Search Authority—The Hague—Feb. 8, 2012.

Pahlavan K., et al.,"Handoff in Hybrid Mobile Data Networks", IEEE Personal Communications, U.S.A., IEEE, Apr. 2000, vol. 7, Issue 2, pp. 34 to 47.

* cited by examiner

SEAMLESS ROAMING

RELATED APPLICATION

This application claims priority to U.S. Provisional Application No. 60/442,973, filed Jan. 27, 2003.

FIELD

The present invention relates generally to wireless networks, and more specifically to coordination and management of such networks.

BACKGROUND

Wireless devices, such as wireless telephones and personal digital assistants, are increasingly used to connect to a network such as the Internet. A wireless device connects to the Internet by establishing a communication link with a base unit that is connected to the Internet. The wireless device will establish a link with a base unit according to some wireless communication protocol, such as Code-Division Multiple Access (CDMA), the "Bluetooth" wireless standard, or one of the 802.11 specifications of the Institute of Electrical and Electronics Engineers (IEEE). Once the wireless link is established with the base unit, the wireless device can communicate over the Internet, such as by sending and receiving packets according to a Transfer Control Protocol/Internet Protocol (TCP/IP) connection.

In order to maintain an established network connection (e.g., TCP/IP connection for the Internet), the wireless device is required to maintain continuous communication with a base unit according to the wireless protocol that was originally used to establish the connection. If the wireless device is moved to a coverage zone of a base unit that operates in accordance with a different protocol, then the network connection is usually broken and a new connection using the different protocol is established. To re-establish a connection within the new coverage zone, the wireless device may need to be re-initialized and re-authenticated according to the different protocol used in the new coverage zone. This handoff process where the existing connection is terminated before the new connection can be re-established is sometimes referred to as a "hard handoff".

For example, FIG. 1 illustrates a "hard handoff" process in a wireless communication system 100 having three wireless communication protocols, CDMA, Bluetooth, and 802.11, within four different coverage zones, Zone A, Zone B, Zone C, and Zone D. Each zone is identified with a respective circle to denote primary area of geographic coverage, with Zone D being the largest circle, encompassing the area representing a CDMA coverage zone for a base station. When a wireless device 102 operating within Zone A with the 802.11 protocol is desired to move to Zone B with the same 802.11 protocol, the wireless device 102 must travel between Zone A and Zone B through Zone D operating with the CDMA protocol. In this case, the network connection made through the 802.11 protocol 104 while in Zone A needs to be terminated, approximately at a location 106, and a new network connection established substantially at the same time, at 108, through the CDMA protocol for wireless communication while the device 102 transits in Zone D. Once the wireless device 102 enters Zone B, the CDMA connection can be terminated at 110 and another new network connection can be established in Zone B, at 112, through the 802.11 protocol. A similar process may be required for the wireless device 102 when it is moving from Zone A (with the 802.11 protocol) to Zone C (with the Bluetooth protocol).

The above-mentioned "hard handoff" process is illustrated in a block diagram 200 in FIG. 2. The wireless device 102 connects to a host 202 through one of several base units 204A, 204B, 204C, 204D that are connected to the Internet. A service provider 206A, 206B, 206C, or 206D corresponding to the respective selected base unit 204A, 204B, 204C, 204D connects the base unit to the Internet. Although four base unit/service provider pairs are illustrated in FIG. 2, it should be understood that a greater or lesser number of base units and service providers might be available to a particular wireless device. Moreover, two or more base units might connect to the Internet through the same provider.

Thus, if the wireless device 102 is currently connected to the host 202 through an 802.11 base unit 204A through a service provider 206A, and it is necessary or desired to connect to the host 202 through another protocol, for example the CDMA base unit 204C, the wireless device 102 will need to terminate its connection to the 802.11 base unit 204A, and initialize and establish a new connection to a CDMA base station 204C and the service provider 206C before the new connection can be made. This adds delay to inter-protocol communications and makes such roaming more complicated. Accordingly, for a wireless device that connects to a host through a network while roaming between coverage zones of various protocols, a protocol transfer process through multiple terminations and re-establishments of a network connection is cumbersome and undesirable.

In view of the foregoing discussion, there is a need for a network connection configuration that allows the wireless device to more efficiently roam between various communication protocols without the repeated terminations and re-establishments of the network connection. The present invention solves this need.

SUMMARY

Embodiments disclosed herein overcome the above-stated shortcomings by providing a network communication to a wireless device through a plurality of available wireless protocol links without repeated termination operations and re-establishment of network connections.

In one aspect, a first protocol link from the plurality of wireless protocol links is selected based on predetermined criteria. A first network connection is established through the first protocol link. A second protocol link is then selected from the plurality of wireless protocol links based on a change in status or condition with respect to the predetermined criteria. A second network connection is established through the second protocol link. After the second link is established, the first network connection through the first protocol link is terminated. The process is transparent to the network connection user.

In another aspect, a wireless network communication system including multiple wireless protocol base units, a wireless device, and a Control Center is described. The wireless protocol base units are adapted to provide a plurality of available wireless protocol links. The wireless communication device provides a user interface for a wireless connection to a network through a first wireless protocol link in the plurality of protocol links. The wireless device also monitors the plurality of wireless protocol links for availability based on predetermined criteria, such that the first wireless protocol link can be replaced with another protocol link from the available protocol links when a status or condition of the first wireless protocol link changes. The Control Center manages mapping of network addresses to provide a smooth transition during the replacement of the first wireless protocol link with another protocol link from the available protocol links.

Other features and advantages of the present invention should be apparent from the following descriptions of the exemplary embodiments, which illustrates, by way of example, the principles of the invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

In recognition of the above-stated difficulties associated with a conventional protocol transfer process that involves repeated terminations and re-establishments of a network connection, this disclosure describes exemplary embodiments for providing a stable network connection that enables a "seamless" roaming experience for a wireless device user who is moving between coverage zones of different protocols without the repeated terminations and re-establishments. This type of protocol handoff is sometimes referred to as a "soft handoff". Consequently, for purposes of illustration and not for purposes of limitation, the exemplary embodiments of the invention are described in a manner consistent with such use, though the invention is not so limited.

Figure 1:
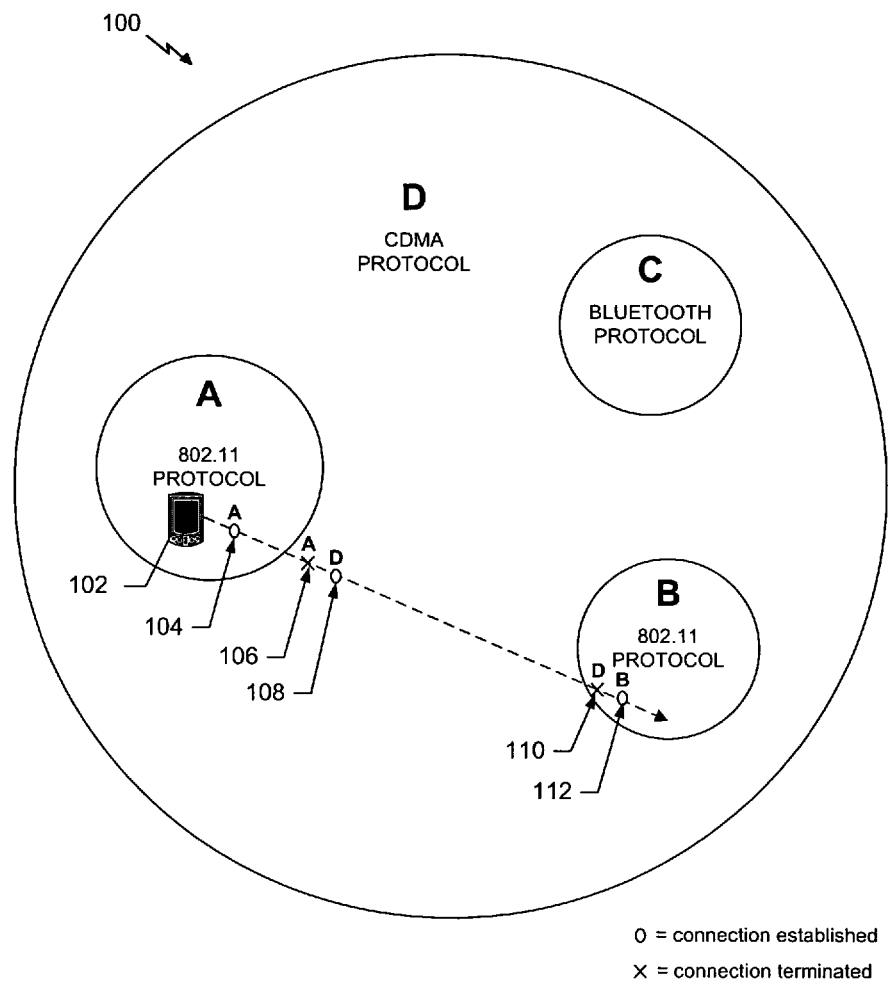
FIG. 1 illustrates a "hard handoff" process in a wireless communication system having three wireless communication protocols within four different coverage zones.
Figure 2:
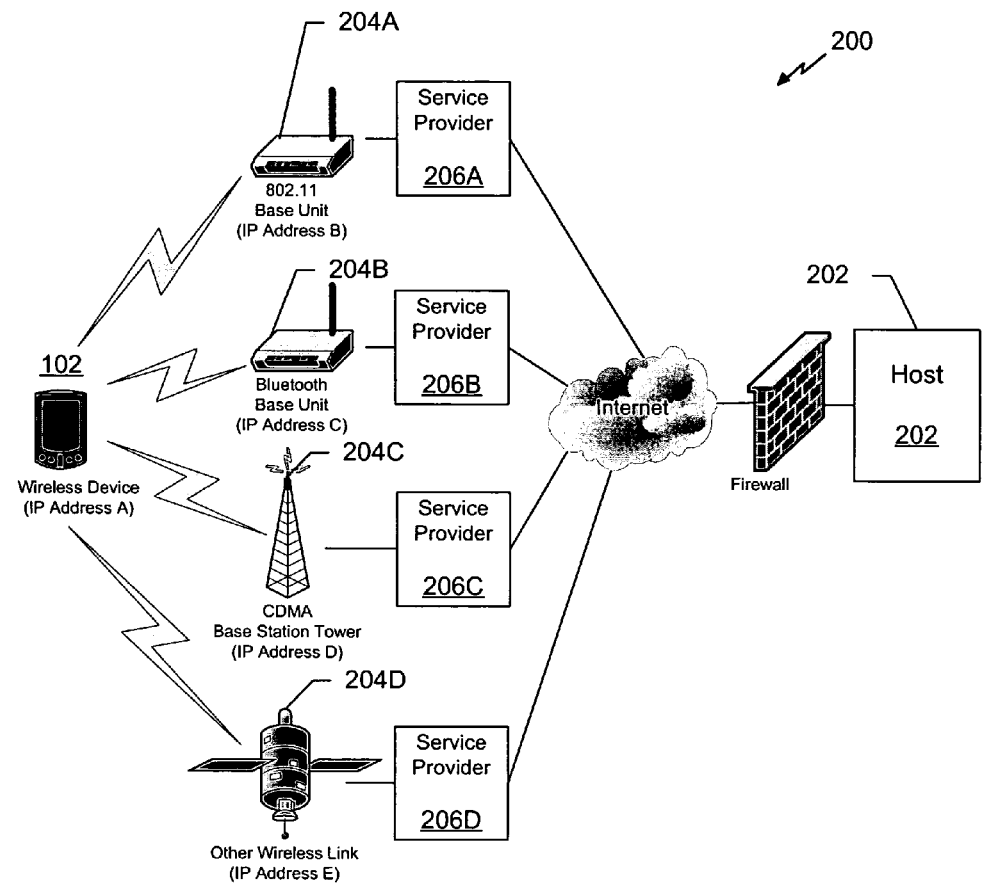
FIG. 2 is a block diagram illustrating the hard handoff process shown in FIG. 1.
Figure 3:
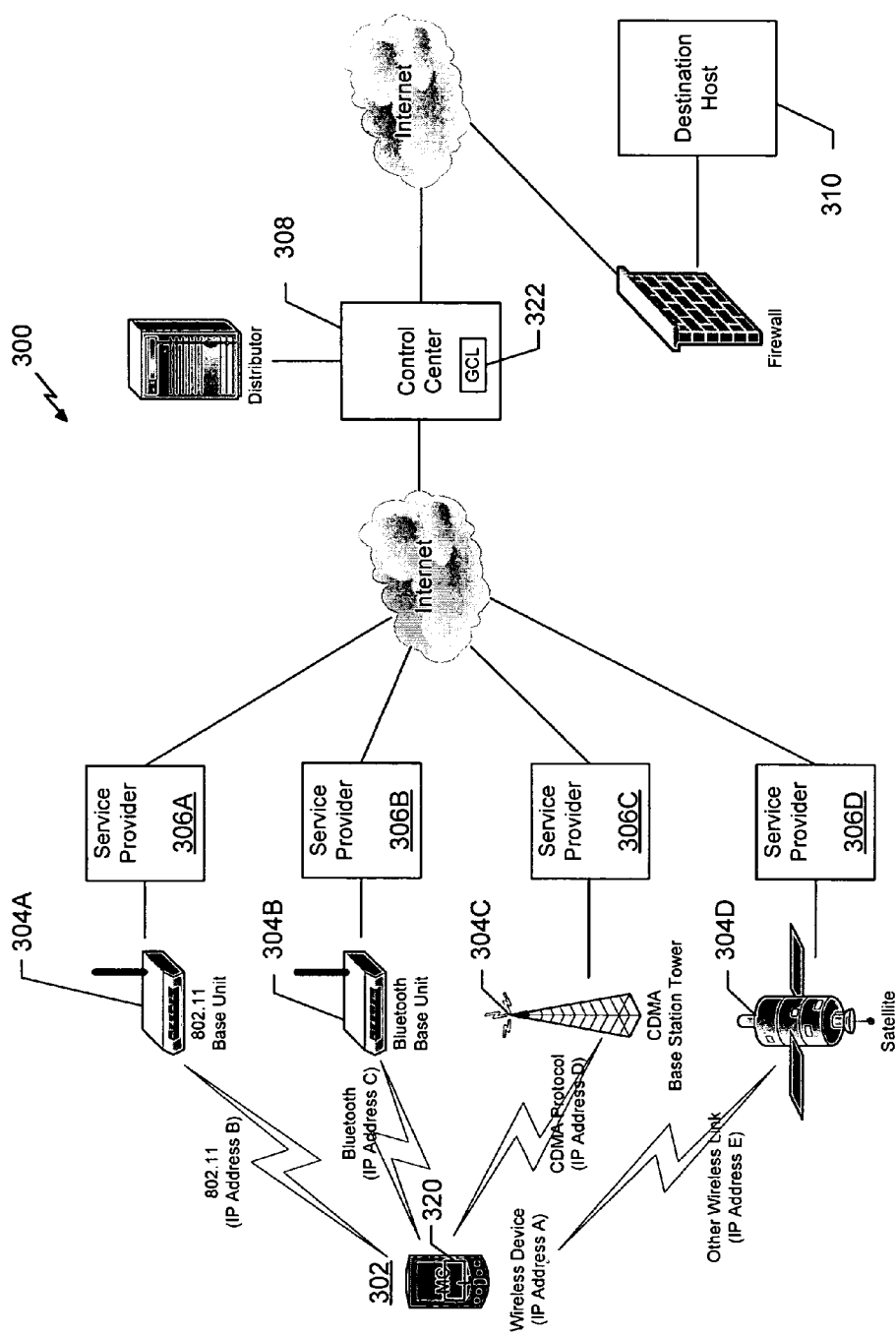
FIG. 3 is a block diagram of a wireless network communication system in accordance with an exemplary embodiment of the present invention.

FIG. 3 is a block diagram of a wireless network communication system 300 constructed in accordance with an exemplary embodiment of the present invention. In the wireless network communication system 300, a wireless device 302 connects to a Destination Host 310 through one of several base units 304A, 304B, 304C, 304D that are connected to the Internet through respective service providers 306A, 306B, 306C, 306D. A reference to the "base unit 304" or the "service provider 306" without a letter suffix will be understood to be a reference to the base units or service providers collectively. The system 300 also includes a mobile connection logic (MCL) 320 that is installed within the wireless device 302 and that selects a communication protocol. The system 300 also includes a Control Center 308, which includes a ground connection logic (GCL) 322.

The MCL 320 in the wireless device 302 is configured to select one wireless communication protocol as a "preferred" interface for current communications. For example, if the wireless device is within a given geographic region, and the available links comprise more than one protocol, such as an 802.11 link 304A and a CDMA link 304C, then the MCL 320 determines the quality of each link and selects one as the preferred interface or link to the Destination Host 310. The link is selected based on predetermined criteria. The "preferred" interface, as used herein, does not necessarily indicate the best link or some other measure of link quality on an absolute basis, but rather represents the "selected" available interface in accordance with the aforementioned criteria. The criteria can be selected by the system designer in accordance with system priorities and characteristics. Hence, the preferred interface can also be selected based on criteria other than the link quality, such as maximum connection speed, cost, or priority of the link as compared with others. Those skilled in the art can readily ascertain the criteria to determine the quality, speed, cost, and priority of the link. For example, the quality of the link can be based on signal strength of communications over the link, while the cost can be based on the cost per minute of the connection fee charged by the service provider. These criteria can also be used to generate a list of available alternate protocol interfaces that can replace the preferred interface when a change in status or condition of the preferred interface is detected. The list of available protocols can include protocol interfaces in a prioritized order, so that a next most "preferred" protocol interface is at the top of the list. Once replaced, the newly selected alternate protocol interface is designated as the preferred protocol interface. The MCL 320 can continuously monitor the communications link to automatically become aware of changing conditions.

If there is only one available protocol link, the MCL 320 detects the available link and configures the wireless device 302 to communicate with the corresponding base unit of the available protocol link as the preferred interface. The MCL 320 may also include a "signal health" monitor that monitors communications conditions and determines which of the available alternate links are operating properly and remain "healthy". It will be apparent to those skilled in the art how the MCL can detect available links and how monitoring of signal health (also referred to as signal strength) can be monitored.

In the illustrated embodiment, the wireless device 302 can select, for example, the 802.11 link as the preferred interface and can communicate with the 802.11 base unit 304A, which connects to a corresponding service provider 306A using the Transfer Control Protocol/Internet Protocol (TCP/IP). If the MCL 320 determines, at some later point in time, that a communication connection through the CDMA link would have a better measured quality than the 802.11 link, then the MCL 320 can instruct the wireless device 302 to change the communication link being used so that the wireless device 302 uses the CDMA protocol by communicating with a CDMA base station 304C. A variety of factors can cause the link quality to change, such as by the wireless device 302 leaving the coverage area of the 802.11 base unit (or whatever the current base unit is) or by a drop in the signal strength of the 802.11 link with respect to the signal strength of the CDMA link.

In general, communication through a TCP/IP connection has a "liveness" check for a predetermined number of seconds (typically checking for an absence of an acknowledgment response for between 5 and 7 seconds) before a connection is dropped and the drop is reported to an operating kernel of the base unit. Therefore, in changing from an 802.11 link to a CDMA link, the MCL 320 initiates and establishes a CDMA link, and then drops the 802.11 link, within that predetermined number of seconds for an acknowledgement response. In this way, the transfer of communications is transparent to the communicating devices in the chain from wireless device 302 to base unit 304 through the service provider 306 and Control Center 308 and to the Destination Host 310. If the transition can be made within the predetermined time, the MCL 320 will be able to perform the soft handoff and provide a "seamless" roaming experience for the wireless device 302.

In the illustrated embodiment, the wireless device 302 is assigned an Internet Protocol (IP) address "A", while the 802.11 base unit is assigned an IP address "B". Other base units such as the Bluetooth base unit, the CDMA base station, and the satellite, are assigned different IP addresses "C", "D", and "E", respectively. Thus, when a wireless device 302 connects to a host 310 through a TCP/IP connection, there will be a link module (e.g., the Control Center) that maps and translates the IP address A of the wireless device 302 to/from the host 310 through the IP addresses B, C, D or E. The specific IP address used to map and translate the data from/to the wireless device 302 to/from the host 310 depends on the selected preferred interface. The service provider 306 and the GCL 322 in the Control Center 308 can perform these functions for mapping, translating, and routing the data packet to/from the host 310.

The GCL 322 in the Control Center 308 maintains a network address translation (NAT) table and a mapping table to map and route data packets going to or coming from the IP address A of the wireless device 302. For example, when a wireless device 302 makes connection to the Internet through the 802.11 link, the Control Center 308 uses the NAT table to match the physical address contained in the data packet (indicating the wireless device 302 network interface card as the packet origin) to the IP address A assigned to the wireless device. The mapping table is then used to route the data packet to/from the IP address A of the wireless device 302 through the IP address B of the 802.11 base unit.

When the MCL 320 decides to transfer the connection to the CDMA link, the MCL 320 notifies the desired change to the GCL 322, which modifies the mapping table to link the IP address A of the wireless device 302 to the IP address D of the CDMA base station 304C. However, in order to provide a smooth handoff (i.e., a "soft handoff"), the MCL 320 may not break off the 802.11 link until the CDMA link is established and verified to be properly operating. Thus, it is possible to have two or more wireless links operating at the same time.

Once the new wireless link has been established and verified, the GCL 322 re-routes data to the wireless device 302 through the new base unit link. Therefore, when a data packet destined for the wireless device arrives at the Control Center 308 from the Destination Host 310, the GCL 322 can determine that the destination of the data packet is the IP address A by extracting the destination physical address from the data packet and correlating the address to a corresponding IP address in the NAT table. The GCL 322 then routes the data packet to the wireless device (IP address A) through the CDMA base station (IP address D) based on the mapping table, which maps the IP address A to the IP address D. The routing of the data packets through various wireless protocol link base units (with each unit having a different IP address) assumes that the base units 304 have been "registered" as being "available" with the GCL 322. The registration involves entering the IP address of the applicable link in the Control Center mapping table and correlating the IP address with a corresponding link.

Figure 4:
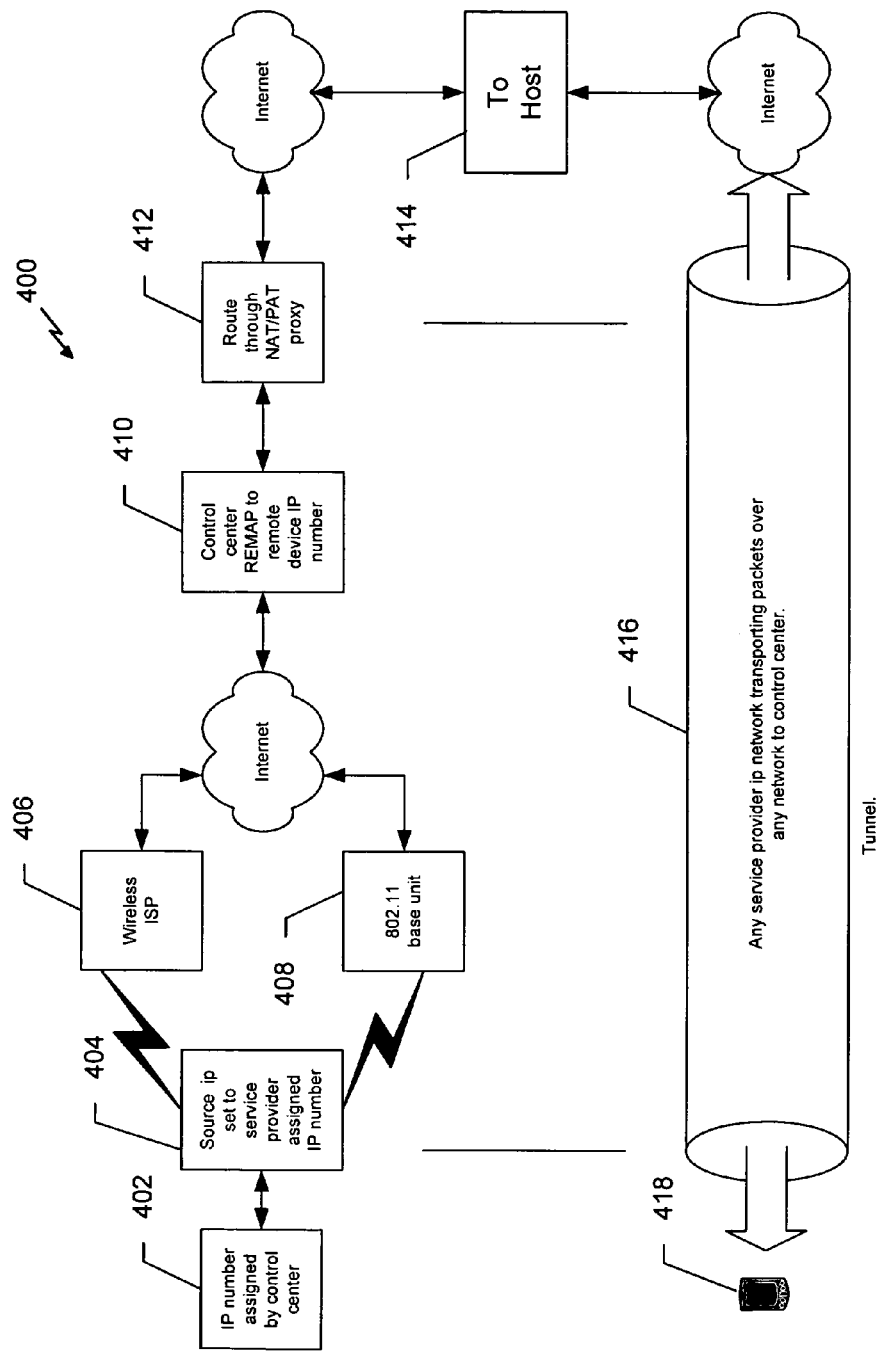
FIG. 4 is a functional block diagram of an exemplary wireless communication system.

A functional block diagram of an exemplary wireless communication system 400 is shown in FIG. 4. An IP address is assigned to a wireless device, as represented at box 402. This IP address is preferably a fixed IP address that is assigned to the wireless device and is used in the NAT table and the mapping table stored in the Control Center to map and route the data to/from the wireless device. The source protocol is then mapped to a service provider-assigned IP address, as represented at box 404, which is used to properly route the data packets to/from the wireless device. In the illustrated embodiment, the data packets can be routed through a CDMA wireless service provider 406 or through an 802.11 base unit 408. These correspond to the CDMA base station tower 304C and 802.11 base unit 304A, along with their corresponding service providers 306C and 306A, respectively, described above in connection with FIG. 3. It should be understood, however, that other wireless service providers, such as a Bluetooth or a satellite service provider, can be used to route the packets. The data packets exchanged between the wireless device and a host site through the Control Center 308 (FIG. 3) are re-mapped at box 410, routed through a proxy at 412, and transmitted to the Destination Host at box 414. The routing is typically performed by a network address translation (NAT) or port address translation (PAT) proxy. Such routing is in accordance with conventional TCP/IP communication standards.

It should be understood that the boxes 404 through 412 can be represented by a "tunnel" 416 that represents any service provider IP network that can transport data packets over any network to the Control Center and eventually to the Internet. That is, the FIG. 4 tunnel 416 in the illustrated block diagram shows that the transfer process between various wireless communication protocols and a wireless device 418 can be made transparent to the wireless device. Thus, the wireless device 418 can roam seamlessly through different wireless communication protocols to access a network such as the Internet.

Figure 5:
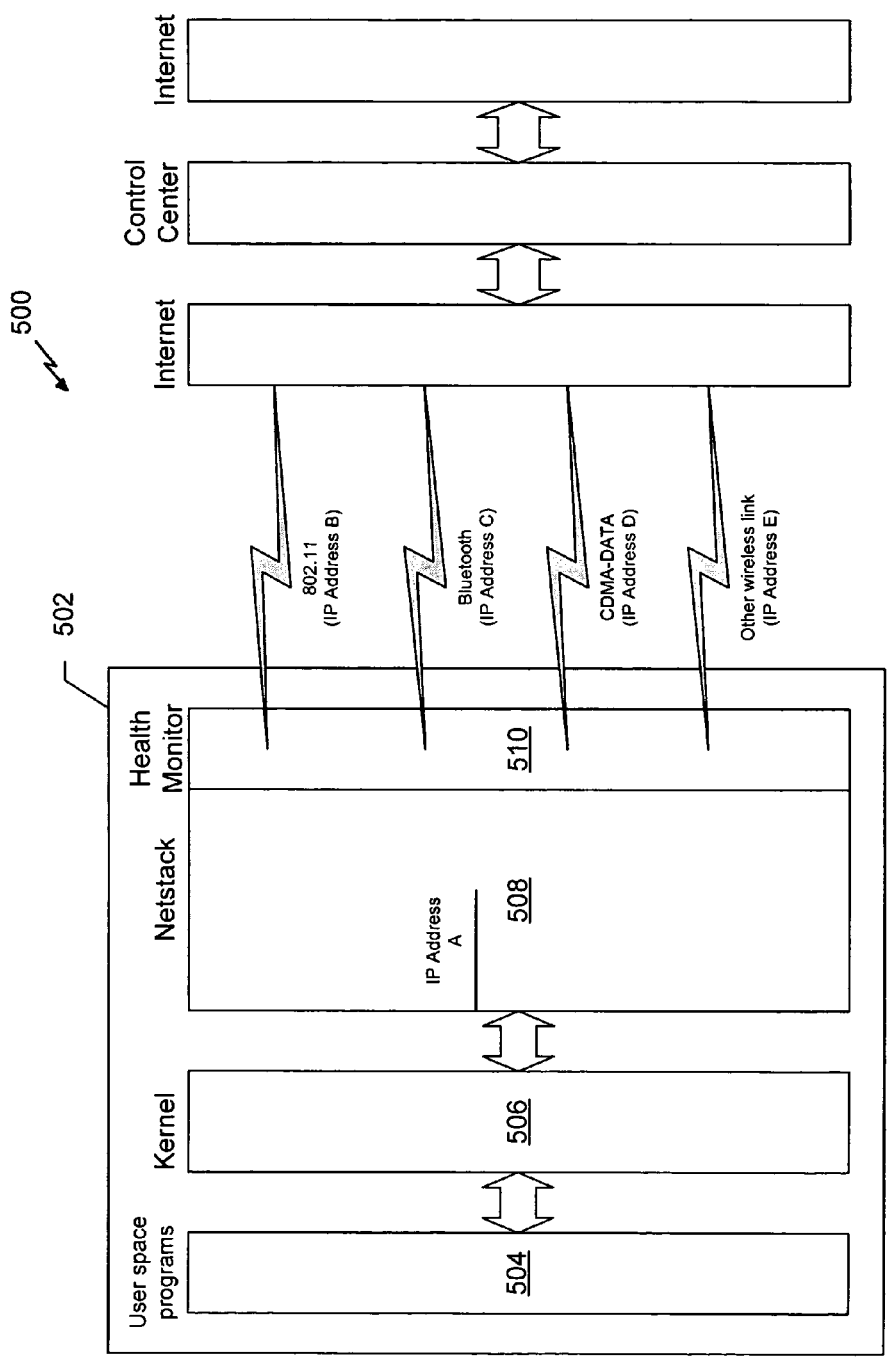
FIG. 5 is a functional block diagram of a mobile connection logic of a wireless device in a communication system.

A functional block diagram of an MCL 502 of an exemplary wireless device in a communication system 500 is illustrated in FIG. 5. The MCL 502 includes User Space programs 504, a kernel 506, a netstack 508, and a health monitor 510. The health monitor 510 monitors the health of various wireless network links. The monitoring process can perform monitoring of the quality and priority of the available wireless links. The prioritization of the wireless links can be performed in one of several different ways. In one embodiment, the health of each wireless link can be sequentially measured and compared to the previously measured and prioritized health levels for other wireless links. In another embodiment, the health of several wireless links can be simultaneously measured and prioritized by placing the measured health levels into a plurality of bins representing different levels of health quality. The exact manner of operation by the health monitor 510 will depend on system requirements, as will be determined by those skilled in the art.

The netstack 508 executes the network protocol processes so that the data can be routed through appropriate links based on the results generated by the heath monitor 510. The kernel 506 performs process management of the interface between the user space programs 504 and the netstack 508.

Figure 6:
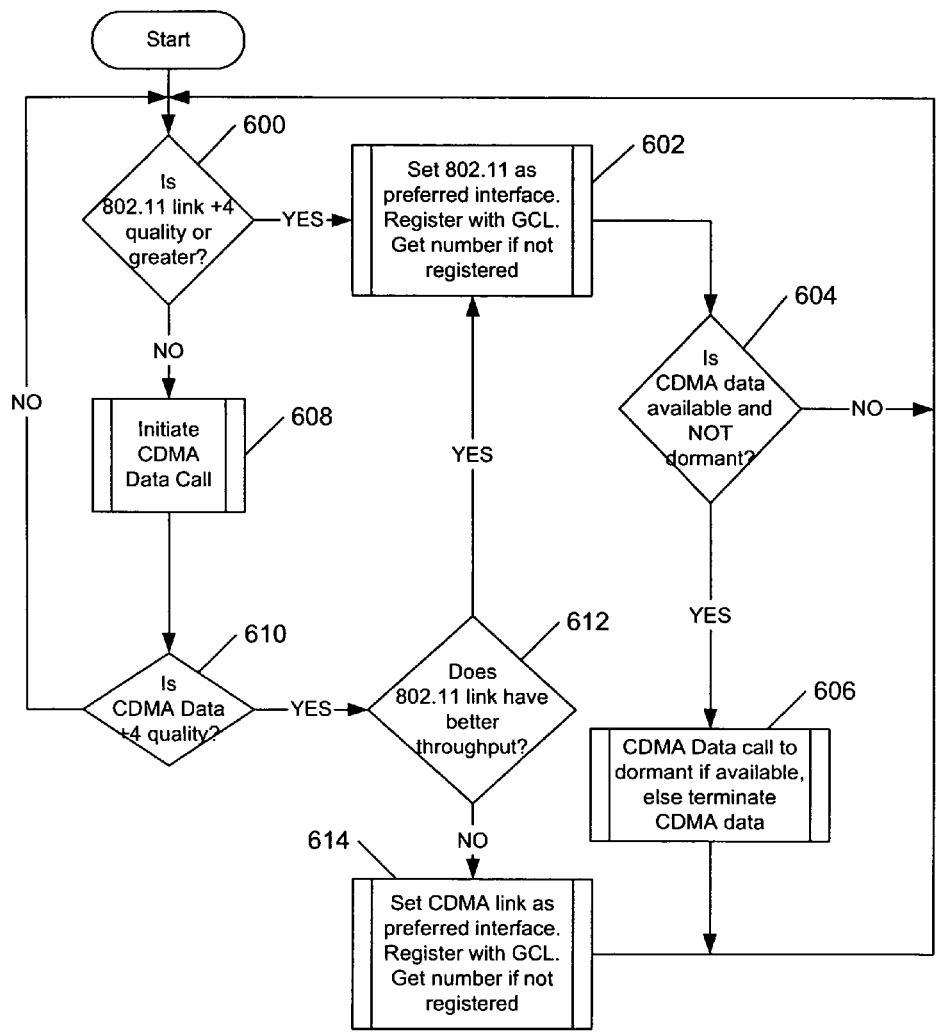
FIG. 6 is a flowchart illustrating an exemplary process to establish a preferred interface or link for a TCP/IP connection.

FIG. 6 is a flowchart illustrating an exemplary process to establish a preferred interface or link for a TCP/IP connection. The exemplary process typically comprises an executing computer process that resides in the MCL 320 of the wireless device 302. The exemplary process addresses only two wireless link protocols, CDMA and 802.11. It should be understood, however, that other protocols are available in the communications system and can be used to provide the TCP/IP connection for the wireless device.

In the illustrated embodiment of FIG. 6, two links, 802.11 and CDMA, are available. If the link qualities are unknown (e.g., at initialization, the link qualities will be unknown), a priority is given to monitoring the 802.11 link because the cost of the 802.11 link is generally lower than the cost of the CDMA link. Hence, it is assumed for the sake of example, that the MCL checks the suitability of the 802.11 link first, if it is available. Therefore, in FIG. 6, the quality of the 802.11 link is monitored, as indicated at box 600.

If the link quality of the 802.11 link is greater than a first predetermined quality value (e.g., greater than +4 quality value), then the 802.11 link is set as a preferred interface, at box 602. If the 802.11 link has not yet been registered with the GCL 322, the MCL 320 obtains the IP address of the 802.11 link and registers the link as the preferred interface. The registration involves entering the IP address of the applicable link in the Control Center mapping table and correlating the IP address with a corresponding link. At box 604, the health and status of the other links, such as the CDMA link, are continuously monitored. If the CDMA data is available and not in a "dormant" mode, the CDMA data call to a dormant mode is made, at box 606, and the process returns to box 600.

The CDMA data connection goes into a "sleep" or "dormant" mode after a specified period of time passes without any data packets being transmitted. A call to a dormant mode is made to conserve network resources because in the dormant mode resources are consumed only when data is being sent or received. This results in benefits for both wireless operators and users. While in "dormant" mode, a Point-to-Point Protocol (PPP) connection is maintained without actively using a traffic channel on the network, and the traffic channel can be allocated to other users on the network. When the wireless device user needs to send or receive a data packet, a traffic channel is automatically reactivated, making the "dormant" period transparent to the user. Hence, users benefit from less airtime charges, and operators can allocate resources to other users on the system in between bursts of data.

If the link quality of the 802.11 link becomes less than the first predetermined quality value, then a CDMA data call is initiated, at box 608. For this example, only two links are available, 802.11 and CDMA. Therefore, the wireless device automatically selects CDMA if 802.11 is not appropriate. Other links would be considered, if available, according to the system priorities and the MCL operation. At box 610, the quality of the CDMA link is checked. If the quality of the CDMA link is greater than a second predetermined quality value (e.g., greater than +4 quality), the 802.11 link is checked to determine if the link has a better throughput than the CDMA link, at 612, even if the 802.11 link quality is less than the first predetermined quality value (e.g., less than +4 link quality). In some embodiments, the first predetermined quality value can be equal to the second predetermined quality value.

If the 802.11 link has a better throughput, then the 802.11 link is set as a preferred interface, at box 602, even though it might have a lower quality value than the CDMA link. Otherwise, if it is determined that the CDMA link has a better throughput, then the CDMA link is set as the preferred interface, at box 614. If the CDMA link has not yet been registered with the GCL 322, the MCL 320 obtains the IP address of the CDMA link and registers the link as the preferred communication interface.

Figure 7:
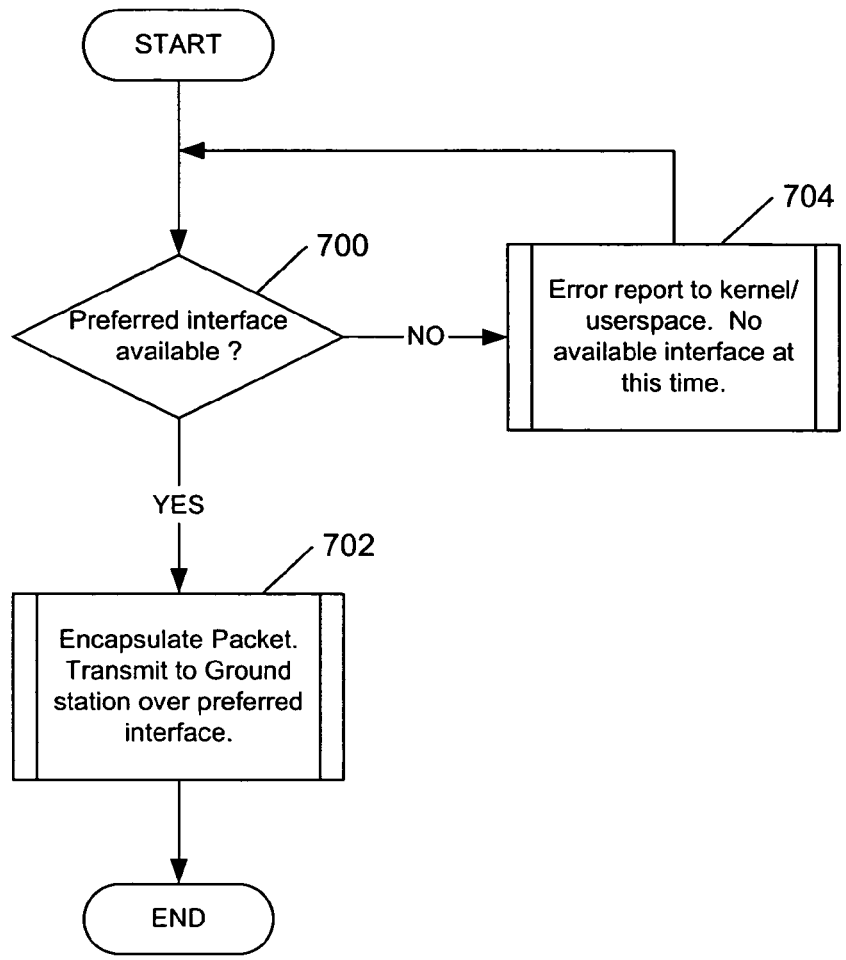
FIG. 7 is a flowchart illustrating an exemplary process for processing a data packet transmitted from the wireless device.

A flowchart illustrating an exemplary process for processing a data packet transmitted from the wireless device is illustrated in FIG. 7. The process initially selects a preferred interface and determines whether the preferred interface is available, as indicated at box 700. If the preferred interface is available, an affirmative outcome at box 700, the data packet is encapsulated with the assigned IP address, at box 702. The packet is then transmitted to the Control Center 308 over the preferred interface. Otherwise, if the preferred interface is not available, an error report is generated and sent to the kernel, at box 704, to indicate that currently there is no available suitable interface.

Figure 8:
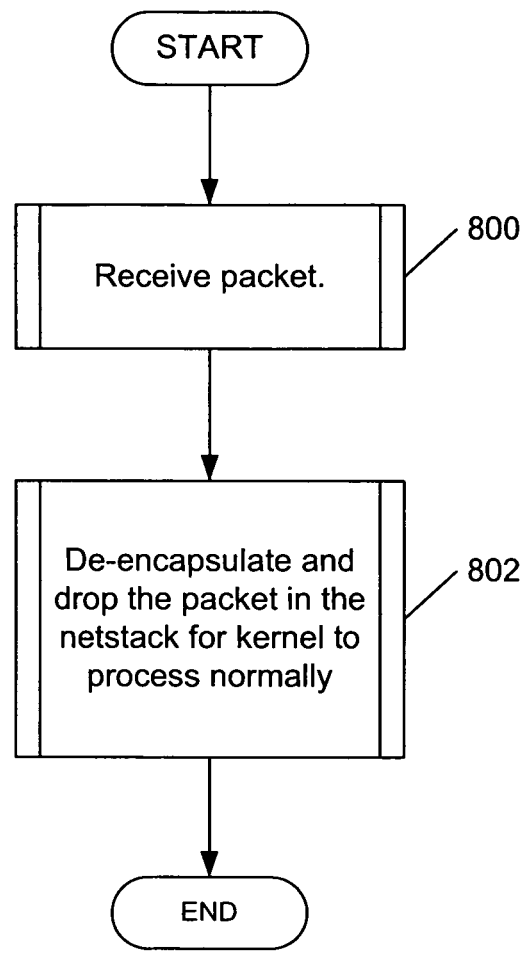
FIG. 8 is a flowchart illustrating an exemplary process for processing a data packet received at the wireless device.

FIG. 8 is a flowchart illustrating an exemplary process for processing a data packet received at the wireless device. The process begins with receiving the data packet, at box 800. The data packet is then de-encapsulated and dropped in the netstack, at box 802, for processing by the kernel.

Figure 9:
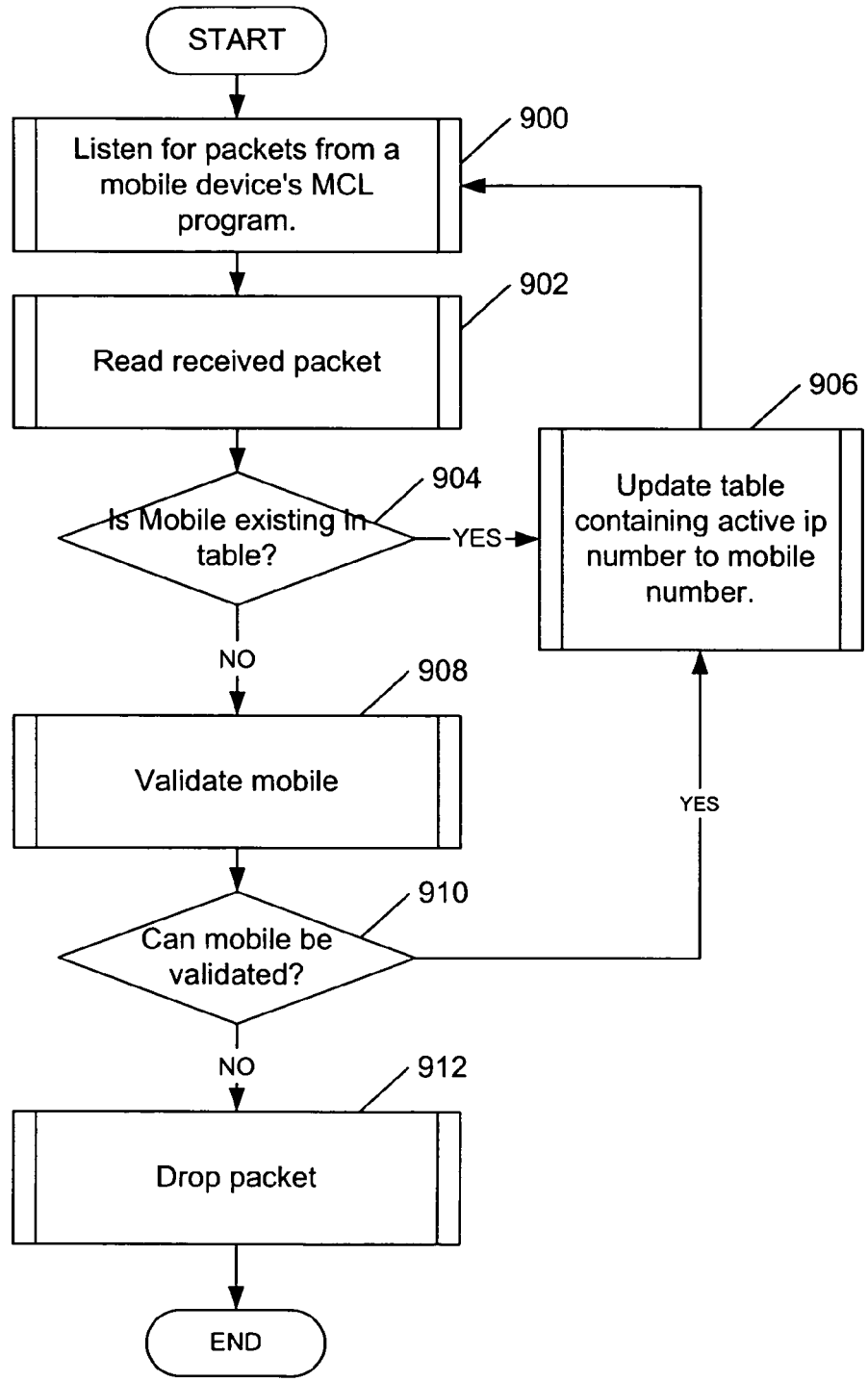
FIG. 9 is a flowchart illustrating an exemplary process to update and maintain the tables in the GCL of the Control Center.

FIG. 9 is a flowchart illustrating an exemplary process to update and maintain the tables in the GCL 322 of the Control Center 308. Data packets received from the MCL 320 of the wireless device 302 are detected, at box 900. The received data packets are then read, at box 902, to determine the IP address of the packet source device. If the IP address of the wireless device is present in the NAT table (determined at box 904), the table is updated, at box 906. The update operation can include indicating in the table that the wireless device is valid and operating. Otherwise, if the IP address of the wireless device is not present in the table, the wireless device is validated, at box 908, as valid and properly operating. The validation operation may involve various implementation issues such as whether the user is registered as a paying customer. The validation operation may also involve registering the wireless device. If the wireless device can be validated, an affirmative outcome at box 910, the table is updated, at box 906. Otherwise, if the wireless device cannot be validated, a negative outcome, the data packet is dropped, at 912.

Figure 10:
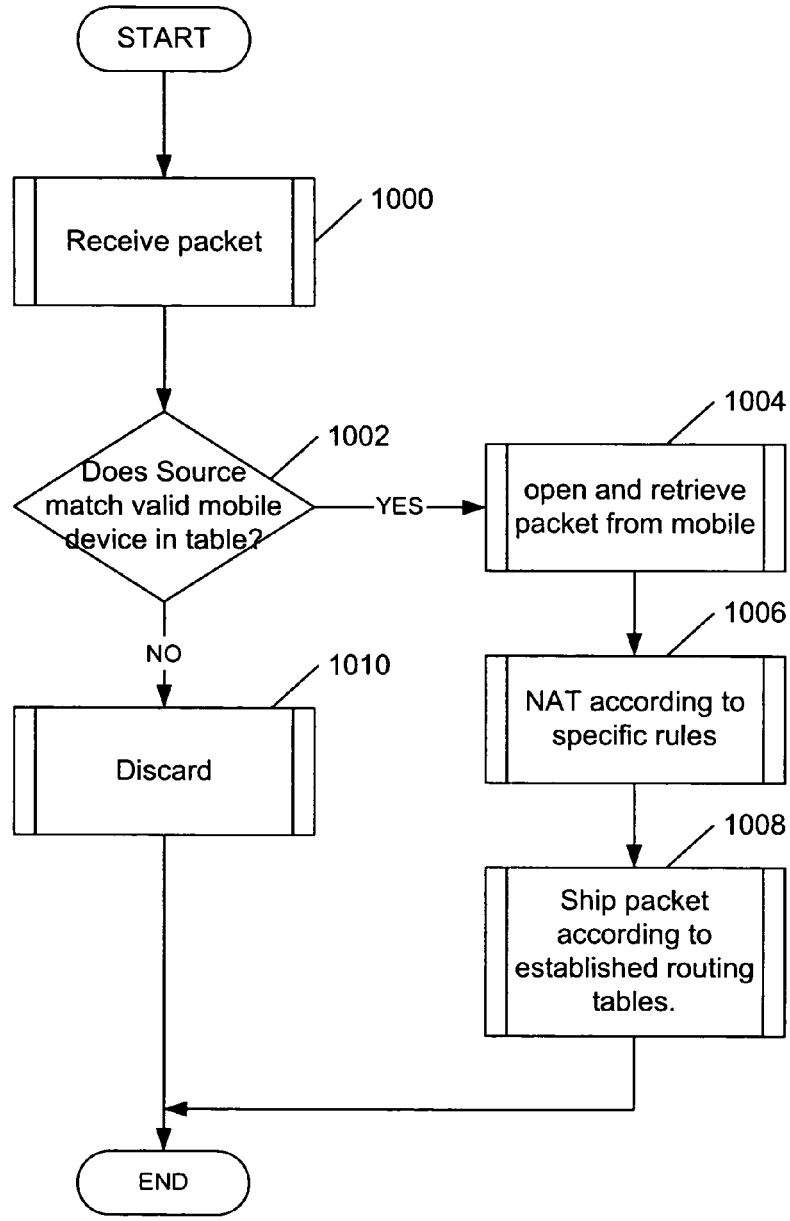
FIG. 10 is a flowchart illustrating an exemplary process for processing a data packet received from the wireless device and transmitted to a destination host.

A flowchart illustrating an exemplary process for processing a data packet received from the wireless device and transmitted to a Destination Host is illustrated in FIG. 10. The exemplary process may reside in the GCL 322 of the Control Center 308.

First, the data packet is received at the Control Center, at box 1000. The packet is checked, at box 1002, to determine if the data source matches a valid wireless device listed in the NAT table. If a match is found, an affirmative outcome at box 1002, the data packet is opened and retrieved, at box 1004. The network address is then translated according to specified rules, at box 1006. The data packet is transmitted to the Destination Host according to a routing or mapping table, at box 1008. If a match is not found, a negative outcome at box 1002, the packet is discarded, at box 1010.

Figure 11:
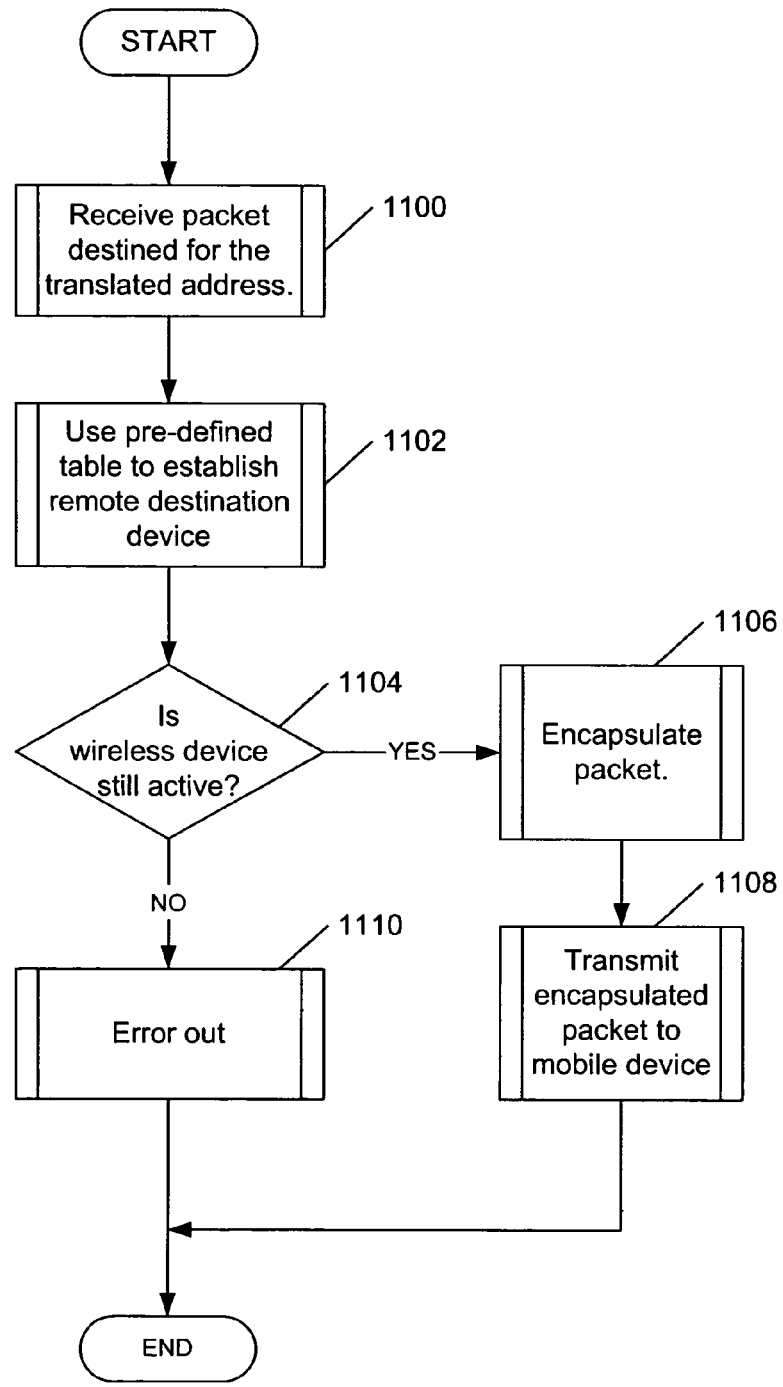
FIG. 11 is a flowchart illustrating an exemplary process for processing a data packet received from the destination host and transmitted to the wireless device.

FIG. 11 is a flowchart illustrating an exemplary process for processing a data packet received from the Destination Host and to be transmitted to the wireless device. The exemplary process may reside in the GCL 322 of the Control Center 308.

The data packet destined for a translated IP address of a wireless device is received from a Destination Host at box 1100. A pre-defined table is used to establish the remote destination wireless device, at box 1102. If the wireless device is determined to be active, an affirmative outcome at box 1104, the data packet is encapsulated, at box 1106, and is transmitted to the wireless device, at box 1108. Otherwise, if the wireless device is no longer active, a negative outcome at box 1104, the process terminates at box 1110 by indicating an error in the destination device.

Although the operations and procedures executed in the MCL and the GCL (described in conjunction with FIGS. 6 through 11) were presented in particular sequences, the operations/procedures generally may be interchanged without departing from the scope of the invention.

The method or technique described in connection with the embodiments disclosed herein may be embodied directly in hardware, in a software module executed by a processor, or in a combination of the two. A software module may reside in random access memory (RAM), flash memory, read-only memory (ROM), erasable programmable read-only memory (EPROM), electrically-erasable PROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

Figure 12:
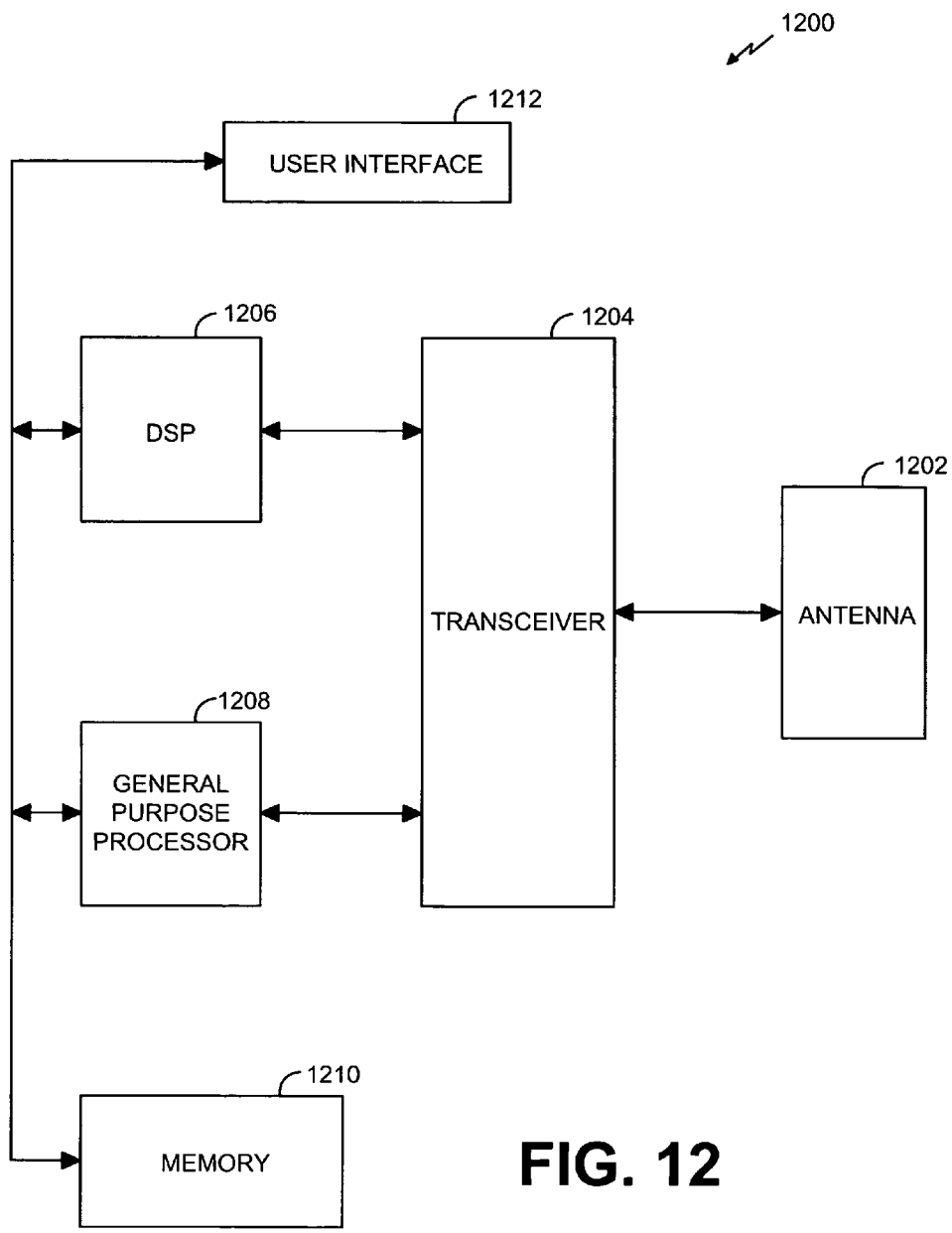
FIG. 12 is a block diagram of a wireless device that operates in the system of FIG. 13.

FIG. 12 is a block diagram of a wireless device 1200, such as a CDMA mobile station, constructed in accordance with one embodiment of the disclosed wireless communication device. The wireless device 1200 includes an antenna 1202, a radio frequency (RF) transceiver 1204, a digital signal processor (DSP) 1206, a general purpose processor 1208, a memory 1210, and a user interface 1212.

In accordance with the disclosed method and apparatus, the antenna 1202 receives forward link signals from one or more base units or stations. The signals are appropriately amplified, filtered and otherwise processed by the transceiver 1204. Output from the transceiver 1204 is then applied to the DSP 1206. The DSP 1206 decodes the received forward link signals. In addition, the DSP 1206 provides an indication as to the relative quality of the received forward link. The indication of relative quality is stored in the remote station memory 1210. The General Purpose Processor 1208 is coupled to the DSP 1206 and to the memory 1210. The General Purpose Processor 1208 reads the indications of relative quality from the memory 1210 and determines the rate at which each received forward link can support data, and determines which forward link can support the highest data rate. Once the General Purpose Processor 1208 has selected the forward link that can support the highest data rate, the General Purpose Processor 1208 communicates the selection to the DSP 1206. The DSP 1206 encodes and modulates the information in the data rate control information, together with any information from the user interface 1212, into a reverse link output signal that is provided to the transceiver 1204. The transceiver processes the reverse link output signal and couples the reverse link output signal to the antenna for transmission to each base station capable of receiving the signal.

In one embodiment, the GPP 1208 includes an MCL adapted to provide a wireless connection to the network through a first wireless protocol link of the plurality of protocol links. The MCL is configured to monitor the plurality of wireless protocol links for availability based on predetermined criteria, such that the first wireless protocol link can be replaced with another protocol link from the available protocol links when a status of the first wireless protocol link changes.

Figure 13:
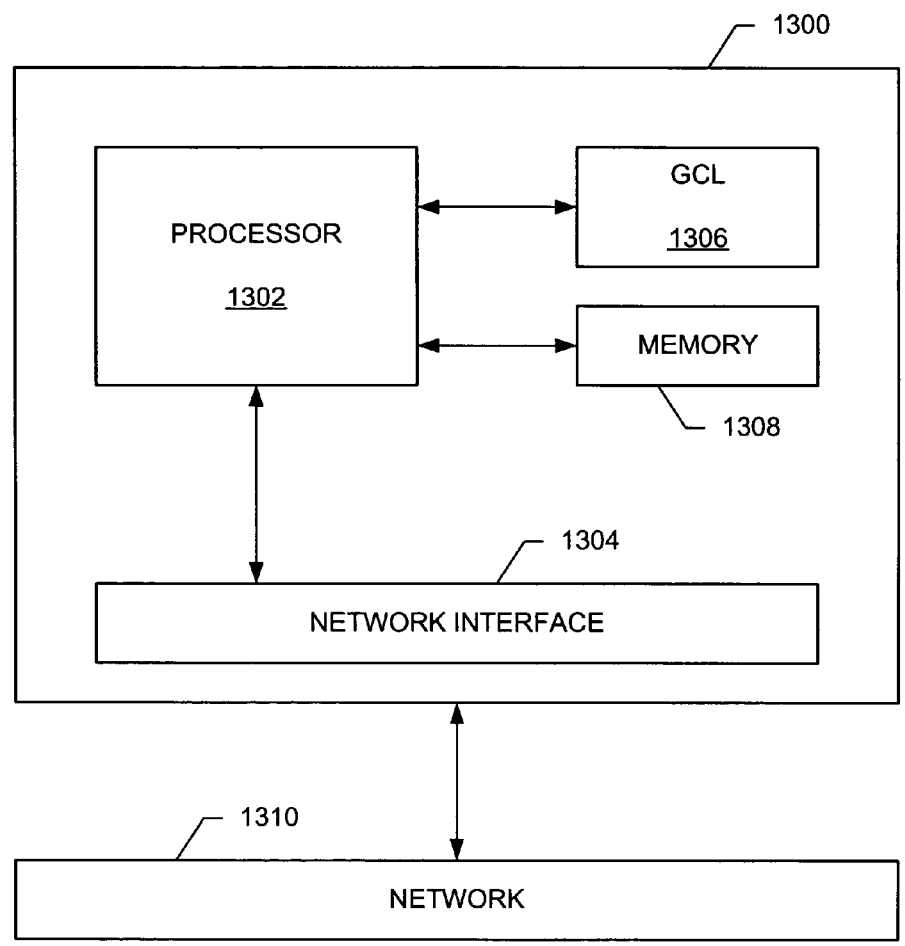
FIG. 13 is a block diagram of a network communication control center that operates in the system of FIG. 3.

FIG. 13 is a block diagram of a network communication control center constructed in accordance with one embodiment of the disclosed Control Center. The network communication control center 1300 includes a processor 1302, a network interface 1304, a ground connection logic (GCL) 1306, and a memory 1308. The network interface 1304 enables the control center 1300 to interface with a network 1310. The processor 1302 manages mapping and routing of data packets between the wireless communication device and the destination host by coordinating the packet processing with the GCL 1306, which maps and routes data packets through different protocol links by using the NAT table and the mapping table stored in the memory 1308. The GCL 1306 manages network addresses of the wireless protocol links to replace the first wireless protocol link with another protocol link from the available protocol links without disrupting communication between the wireless communication device and the destination host.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and procedures described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

provided to enable any person skilled in the art to make or use the present invention. Various modifications to these embodiments will be readily apparent to those skilled in the art, and the generic principles defined herein may be applied to other embodiments without departing from the spirit or scope of the invention. For example, although the illustrated embodiments discuss having two wireless protocol links simultaneously connected during "soft handoff", it is possible to have more than two link connections for some reason, such as for increased bandwidth or data rate. Thus, the present invention is not intended to be limited to the embodiments shown herein but is to be accorded the widest scope consistent with the principles and novel features disclosed herein.

What is claimed is:

1. A method, to be executed by a wireless communication device, for selecting a wireless device network communication link to a destination host through one of a plurality of available wireless protocol links, the method comprising:
   selecting a first protocol link from the plurality of available wireless protocol links based on predetermined criteria;
   establishing a first Transfer Control Protocol/Internet Protocol (TCP/IP) network connection through the first protocol link, wherein the wireless device has a designated IP address;
   detecting a change in status of the predetermined criteria of the first protocol link;
   selecting a second protocol link from the plurality of available wireless protocol links based on the change in status of the predetermined criteria;
   establishing a second Transfer Control Protocol/Internet Protocol (TCP/IP) network connection through the second protocol link, using the designated IP address for the wireless device;
   verifying that the second TCP/IP network connection through the second protocol link is established and properly operating; and
   terminating the first TCP/IP network connection through the first protocol link in response to the verification, such that the wireless device does not lose network communication with the destination host.

2. The method of claim 1, wherein the predetermined criteria includes a link quality value.

3. The method of claim 2, wherein the link quality value is measured by a signal strength of the protocol link.

4. The method of claim 1, wherein the predetermined criteria includes a connection fee charged by a service provider of the protocol link.

5. The method of claim 1, wherein selecting a first protocol link includes communicating with a first service provider adapted to provide and maintain the first protocol link.

6. The method of claim 1, wherein selecting a first protocol link includes communicating with a first base unit providing network communication using the first protocol link.

7. The method of claim 6, wherein establishing a first network connection includes assigning a first network address to the first base unit.

8. The method of claim 7, wherein establishing a first network connection includes assigning a second network address to the wireless device.

9. The method of claim 8, wherein establishing a first network connection includes mapping the second network address to the first network address so that data can be routed to the wireless device through the first base unit.

10. The method of claim 1, wherein the change in status or condition of the first protocol link with respect to the predetermined criteria includes a situation where signal strength of the first protocol link falls below signal strength of the second protocol link.

11. The method of claim 1, wherein selecting a second protocol link and establishing a second network connection are performed within a predetermined amount of time allotted for a liveness check so that a transition between the first network connection and the second network connection is transparent to the wireless device.

12. The method of claim 1, wherein selecting a second protocol link includes communicating with a second base unit providing the second protocol link.

13. The method of claim 12, wherein establishing a second network connection includes assigning a third network address to the second base unit.

14. The method of claim 13, wherein establishing a second network connection includes assigning a second network address to the wireless device, wherein the second network address is the designated IP address for the wireless device.

15. The method of claim 14, wherein establishing a second network connection includes mapping the second network address to the third network address so that data can be re-routed to the wireless device through the second base unit.

16. The method of claim 1, further comprising:
   generating a mapping table for mapping the wireless device to the first protocol link.

17. The method of claim 16, further comprising:
   updating the mapping table to map the wireless device to the second protocol link.

18. The method of claim 17, further comprising:
   using a network address translation (NAT) table to route data to/from the wireless device from/to a network host site.

19. A wireless network communication system, comprising:
   a plurality of wireless protocol base units each of which is adapted to provide a wireless protocol link to a network destination host to provide a Transfer Control Protocol/Internet Protocol (TCP/IP) connection to the destination host;
   a wireless communication device having a designated IP address adapted to provide a wireless TCP/IP connection to the network through a first wireless protocol link of the plurality of protocol links, and configured to monitor the plurality of wireless protocol links for availability based on predetermined criteria, such that the first wireless protocol link can be replaced with a second protocol link from the available protocol links when a status of the first wireless protocol link changes, wherein the second protocol link is verified to be established and properly operating before terminating the first protocol link; and
   a Control Center configured to manage mapping of network addresses to replace the first wireless protocol link with another protocol link from the available protocol links, while maintaining the designated IP address for the wireless communication device without disrupting communication between the wireless communication device and the destination host.

20. The wireless network communication system of claim 19, further comprising:
   a plurality of service providers corresponding to the plurality of wireless protocol base units, wherein the service providers enable wireless network connection to the wireless communication device through the wireless protocol base units.

21. The wireless network communication system of claim 19, wherein the wireless communication device includes a health monitor for monitoring health of the plurality of wireless protocol links.

22. The wireless network communication system of claim 21, wherein the wireless communication device includes a mobile connection logic for generating a list of prioritized wireless protocol links for replacement of the first wireless protocol link.

23. The wireless network communication system of claim 19, wherein the available protocol links include wireless protocol links with signal strengths above a predetermined level.

24. The wireless network communication system of claim 19, further comprising:
a mapping table configured to map wireless protocol links to the wireless communication device.

25. The wireless network communication system of claim 24, further comprising:
a ground connection logic in the Control Center adapted to route data packets according the mapping table.

26. The wireless network communication system of claim 25, wherein the ground connection logic routes data packets by encapsulating packets to the designated IP address for the wireless communication device with network addresses mapped by the mapping table.

27. A wireless device configured for a wireless Transfer Control Protocol/Internet Protocol (TCP/IP) connection to a network, the wireless device comprising:
a transceiver configured to receive forward link signals that have been transmitted from a plurality of base units providing a plurality of protocol links, and to transmit appropriately-powered reverse link signals to the plurality of base units;
a digital signal processor configured to demodulate and decode the forward link signals, and to modulate and encode the reverse link signals; and
a mobile connection logic configured to provide the wireless TCP/IP connection to the network through a first wireless protocol link of the plurality of protocol links using a designated IP address for the wireless device, the mobile connection logic configured to monitor the plurality of wireless protocol links for availability based on predetermined criteria, such that the first wireless protocol link can be replaced with a second protocol link from the available protocol links when a status of the first wireless protocol link changes, wherein the second protocol link maintains the TCP/IP connection to the network and the designated IP address of the wireless device is maintained, and wherein the second protocol link is verified to be established and properly operating before terminating the first protocol link.

28. The wireless device of claim 27, wherein the mobile connection logic includes:
a first memory configured to store data comprising parameters related to the first wireless protocol link.

29. The wireless device of claim 28, wherein the mobile connection logic includes:
a second memory configured to store data comprising parameters related to the second wireless protocol link, such that parameters stored in the second memory are transferred to the first memory when the mobile connection logic determines that the second protocol link is established and verified to be properly operating.

30. A network communication control center for enabling a wireless Transfer Control Protocol/Internet Protocol (TCP/IP) connection to a network for a wireless device, comprising:
a network interface adapted to enable the control center to interface with the network;
a ground connection logic configured to map and route data packets transmitted between the wireless device having a designated IP address and a destination host over a Transfer Control Protocol/Internet Protocol (TCP/IP) connection through a plurality of wireless protocol links by using data tables, the ground connection logic operating to manage network IP addresses of the plurality of wireless protocol links, such that a first wireless protocol link can be replaced with a second protocol link from the available protocol links without disrupting communication over the TCP/IP connection between the wireless device and the destination host using the same designated IP address for the wireless device, wherein the second protocol link is verified to be established and properly operating before terminating the first protocol link.

31. The network communication control center of claim 30, wherein the data tables include:
an NAT table configured to enable the ground connection to match a physical address contained in the data packet to a first network address assigned to the wireless device, wherein the first network address is the designated IP address for the wireless device.

32. The network communication control center of claim 30, wherein the data tables include:
a mapping table configured to enable the ground connection logic to route the data packet to or from a first network address assigned to the wireless device through a second network address assigned to a base unit that is providing a wireless link to the selected second wireless protocol link, wherein the first network address is the designated IP address for the wireless device.

33. An apparatus for selecting a wireless device network communication link to a destination host through one of a plurality of available wireless protocol links, the apparatus comprising:
means for selecting a first protocol link from the plurality of available wireless protocol links based on predetermined criteria;
means for establishing a first Transfer Control Protocol/Internet Protocol (TCP/IP) network connection through the first protocol link, wherein the wireless device has a designated IP address;
means for detecting a change in status of the predetermined criteria of the first protocol link;
means for selecting a second protocol link from the plurality of available wireless protocol links based on the change in status of the predetermined criteria;
means for establishing a second Transfer Control Protocol/Internet Protocol (TCP/IP) network connection through the second protocol link, using the designated IP address for the wireless device;
means for verifying that the second TCP/IP network connection through the second protocol link is established and properly operating; and
means for terminating the first TCP/IP network connection through the first protocol link in response to the verification, such that the wireless device does not lose network communication with the destination host.

34. A non-transitory computer-readable medium comprising code, which, when executed by a machine, causes the machine to perform operations for selecting a wireless device network communication link to a destination host through one of a plurality of available wireless protocol links, the computer-readable medium comprising:
code for selecting a first protocol link from the plurality of available wireless protocol links based on predetermined criteria;
code for establishing a first Transfer Control Protocol/Internet Protocol (TCP/IP) network connection through the first protocol link, wherein the wireless device has a designated IP address;
code for detecting a change in status of the predetermined criteria of the first protocol link;

code for selecting a second protocol link from the plurality of available wireless protocol links based on the change in status of the predetermined criteria;

code for establishing a second Transfer Control Protocol/Internet Protocol (TCP/IP) network connection through the second protocol link, using the designated IP address for the wireless device;

code for verifying that the second TCP/IP network connection through the second protocol link is established and properly operating; and code for terminating the first TCP/IP network connection through the first protocol link in response to the verification, such that the wireless device does not lose network communication with the destination host.

35. The method of claim 1, wherein the first protocol link is one of an 802.11 link or a CDMA link, and wherein the second protocol link is the other of the 802.11 link or the CDMA link.

* * * * *